US010952519B1

(12) United States Patent
Hayman (10) Patent No.: US 10,952,519 B1
(45) Date of Patent: Mar. 23, 2021

(54) VIRTUAL HUB FOR THREE-STEP PROCESS FOR MIMICKING PLASTIC SURGERY RESULTS

(71) Applicant: Hillary Hayman, Los Angeles, CA (US)

(72) Inventor: Hillary Hayman, Los Angeles, CA (US)

(73) Assignee: Elyse Enterprises LLC, Los Angeles, CA (US)

( * ) Notice: Subject to any disclaimer, the term of this patent is extended or adjusted under 35 U.S.C. 154(b) by 0 days.

(21) Appl. No.: 16/931,233

(22) Filed: Jul. 16, 2020

(51) Int. Cl.
*A45D 44/00* (2006.01)
*G06Q 50/00* (2012.01)
*G06F 3/0481* (2013.01)

(52) U.S. Cl.
CPC ....... *A45D 44/005* (2013.01); *G06F 3/04815* (2013.01); *G06Q 50/01* (2013.01); *A45D 2044/007* (2013.01)

(58) Field of Classification Search
CPC ............ A45D 44/005; A45D 2044/007; G06F 3/04815; G06Q 50/01
USPC ........................................................ 510/186
See application file for complete search history.

(56) References Cited

U.S. PATENT DOCUMENTS

| | | |
|---|---|---|
| 3,476,123 A | 11/1969 | Flax |
| 3,641,334 A | 2/1972 | Kipping |
| 5,035,344 A | 7/1991 | Christopher |
| 5,583,761 A | 12/1996 | Chon |
| 5,941,255 A | 8/1999 | Chen |
| 6,559,861 B1 | 5/2003 | Kennelly |
| 7,740,370 B2 | 6/2010 | Campbell et al. |
| 8,376,984 B2 | 2/2013 | James |

(Continued)

FOREIGN PATENT DOCUMENTS

| | | |
|---|---|---|
| JP | 2019511343 | 4/2019 |
| KR | 2092204 | 3/2020 |
| WO | 2015097183 | 7/2015 |

OTHER PUBLICATIONS

International Search Authority, International Search Report and Written Opinion for PCT/US20/42662, dated Sep. 30, 2020.

(Continued)

*Primary Examiner* — Michael R Neff
(74) *Attorney, Agent, or Firm* — Patent Ingenuity, P.C.; Samuel K. Simpson (57) ABSTRACT

A computer program product comprises a non-transitory computer readable storage that has a computer readable program stored thereon. When executed on a computer, the computer readable program causes the computer to generate, with a processor, a graphical user interface that provides audiovisual content associated with a three-step skincare treatment process. In particular, the first step of the three-step skincare treatment process performs, with a derma roller, a plurality of movements along an area of intended rejuvenation of a human user. A second step of the three-step skincare treatment process applies, subsequent to the derma roller performance, a chemical compound to one or more patches of skin at the area of intended rejuvenation. Finally, a third step of the three-step skincare treatment process emits, subsequent to the application of the chemical compound, light toward the area of intended rejuvenation. The three-step process may be customized to a user.

20 Claims, 10 Drawing Sheets

(56) References Cited

U.S. PATENT DOCUMENTS

| | | | |
|---|---|---|---|
| 8,858,312 | B1 | 10/2014 | Ward |
| 9,144,434 | B1* | 9/2015 | Rodan .................. A61K 8/64 |
| 10,438,265 | B1 | 10/2019 | Brown, III |
| 10,485,755 | B1 | 11/2019 | Cheng |
| 2002/0133523 | A1 | 9/2002 | Ambler |
| 2003/0065526 | A1 | 4/2003 | Giacchetti |
| 2004/0085570 | A1 | 5/2004 | Sfaelos |
| 2004/0191330 | A1 | 9/2004 | Keefe |
| 2005/0154381 | A1 | 7/2005 | Altshuler |
| 2006/0167677 | A1 | 7/2006 | Bitzer |
| 2007/0073217 | A1 | 3/2007 | James |
| 2007/0124675 | A1 | 5/2007 | Ban |
| 2008/0161661 | A1 | 7/2008 | Gizewski |
| 2008/0300518 | A1 | 12/2008 | Bowes |
| 2009/0118698 | A1 | 5/2009 | Liebl |
| 2010/0045427 | A1 | 2/2010 | Boone, III et al. |
| 2010/0185064 | A1 | 7/2010 | Bandic |
| 2011/0040236 | A1 | 2/2011 | Isaacs et al. |
| 2011/0040571 | A1 | 2/2011 | Warren |
| 2011/0201900 | A1 | 8/2011 | Zhang |
| 2011/0301441 | A1 | 12/2011 | Bandic |
| 2012/0010886 | A1 | 1/2012 | Razavilar |
| 2013/0150826 | A1 | 6/2013 | Almohizea |
| 2013/0150878 | A1 | 6/2013 | Church |
| 2014/0297258 | A1 | 10/2014 | Kiss |
| 2014/0304629 | A1 | 10/2014 | Cummins |
| 2015/0005326 | A1 | 1/2015 | Jang et al. |
| 2015/0065950 | A1 | 3/2015 | Banar |
| 2015/0182757 | A1 | 7/2015 | Levine |
| 2015/0231382 | A1* | 8/2015 | Altarac ............ A61M 37/0015 604/47 |
| 2015/0339757 | A1 | 11/2015 | Aarbi |
| 2015/0347394 | A1 | 12/2015 | Hirama |
| 2015/0347396 | A1 | 12/2015 | Goldberger |
| 2016/0135889 | A1 | 5/2016 | Serrano Sanmiguel et al. |
| 2016/0162728 | A1 | 6/2016 | Arai et al. |
| 2016/0184566 | A1 | 6/2016 | Ibrahim |
| 2016/0210764 | A1 | 7/2016 | Gomi |
| 2016/0279401 | A1 | 9/2016 | Schwab |
| 2016/0335910 | A1 | 11/2016 | Baumann |
| 2016/0357578 | A1* | 12/2016 | Kim .................... A45D 44/005 |
| 2017/0256084 | A1 | 9/2017 | Iglehart |
| 2017/0340267 | A1 | 11/2017 | Shen |
| 2018/0071547 | A1 | 3/2018 | Decaux et al. |
| 2018/0075776 | A1* | 3/2018 | Heitmann ................ A45D 1/04 |
| 2018/0125201 | A1* | 5/2018 | Nichols ............. A46B 15/0004 |
| 2018/0185196 | A1 | 7/2018 | Levinson et al. |
| 2019/0091113 | A1* | 3/2019 | Danto .................. A61K 8/0204 |
| 2019/0192065 | A1 | 6/2019 | Nyambi |
| 2019/0387930 | A1 | 12/2019 | Fauconnier |
| 2020/0069034 | A1* | 3/2020 | Godlieb ................. A45D 40/30 |
| 2020/0121354 | A1 | 4/2020 | Ginggen et al. |
| 2020/0196736 | A1 | 6/2020 | Stanley |
| 2020/0214428 | A1* | 7/2020 | Shih .................... G06K 9/00281 |
| 2020/0246039 | A1* | 8/2020 | Levinson ........... A61B 10/0266 |

OTHER PUBLICATIONS

Martanto, W., et al. "Microinfusion Using Hollow Microneedles," Pharmaceutical Research, vol. 23, No. 1, pp. 104-113, Jan. 2006.

Spiegel, J., "How Creams with Caffeine Can Help Your Skin," https://www.drspiegel.com/skin-care/how-creams-with-caffeine-can-help-your-skin/, Oct. 8, 2015.

Gallagher, G., "The Benefits of a Face Roller," https://www.healthline.com/health/face-roller-benefits, Jan. 31, 2020.

International Search Authority, International Search Report and Written Opinion for PCT/US20/42603, dated Oct. 15, 2020.

Singh, A., et al., "Microneedling: Advances and Widening Horizons," Indian Dermatology Online Journal, https://www.ncbi.nim.nih.gov/pmc/articles/PMC4976400/, pp. 1-21, Jul.-Aug. 2016.

Youyaner, "How to Choose the Best Derma Roller Needle Size," http://dermarollerinfo.com/derma-roller-needle-size/, pp. 1-4, Feb. 6, 2020.

International Search Authority, International Search Report and Written Opinion for PCT/US20/42655, dated Nov. 6, 2020.

Westofwild, "A Powerful Anti-Aging Ritual You Can Do At Home," https://www.wowpublicatnoi.com/2020/03/anti-aging-skincare-ritual-at-home/, Mar. 20, 2020.

(540 Needles) Derma Micro Needle Titanium Roller for Acne Skin Care Kit 0.5mm, Sep. 15, 2020, e8ay.com, «https:1/www.ebay.com/itm/540-Needles-Derma-Micro-Needle-Titanium-Roller-for-Acne-Skin-Care-Kit-0-Smm/362590162763?var=631740040741&hash=item546cOecf4b:g:xaAAAOSwi7ZckivG» (Year: 2019).

51 N 1 Derma Roller Skin Care Set 0.5-1-1.5-2 mm w/ Free Retinol Cream 1.75 fl oz, Sep. 15, 2020, e8ay.com «https:// www .ebay.com/itm/51 N 1-Derma-Roller-Skin-Care-Set-0-5-1-1-5-2-mm-w-Free-Retinol-Cream-1-75-fl-oz/171102593623?hash=item27d6826257:g:pM8AAOSwLKhb-uEb» (Year: 2018).

Derma Roller Kit Titanium+ H/A Retinol Serum+ D/8 Repair Gel+ Derma Clean, Sep. 15, 2020, e8ay.com «https://www.ebay.com/itm/Derma-Roller-Kit-Titanium-H-A-Retinol-Serum-D-8-Repair-Gel-Derma-Clean/332484110533?var=542772600872&hash=item4d6998e8c5:g:RGOAAOSwyZhfM2z6» (Year: 2018).

FDA Approved | Wireless 7 Color LED Face Mask | DermRenew LED Photon Mask with 540 Titanium Micro Needle Derma Roller, Sep. 15, 2020, amazon.com «https://www.amazon.com/DermRenew-Wireless-Titanium-Protective-Reuseable/dp/807W8VQDN» (Year: 2019).

Revive Light Therapy, "Can You Use Retinol with Red Light Therapy?" https://revivelighttherapy.com/blog/can-use-retinol-led-light-therapy-products-togeher/, Feb. 28, 2020.

Clementoni, Matteo, et al. "Photodynamic Photorejuvenation of the Face with a Combination of Microneedling. Red Light, and Broadband Pulsed Light," Lasers in Surgery and Medicine, vol. 42, pp. 150-159.

Alster, Tina, et al., "Microneedling: A Review and Practical Guide," Dermatol Surg. 2017, 2017.

Zdunska, Kamila, et al. "Is skin microneedling a good alternative method of various skin defects removal," Dermatologic Therapy, 2018.

International Search Authority, International Search Report and Written Opinion for PCT/US20/42621, dated Oct. 26, 2020.

"Sephora: BeautyBio GloPRO Microneedling Facial Regeneration Tool, Sephora, May 28, 2020 "https://web.archive.orglweb/20200528160512/https://www.sephora.com/productlglopro-microneedling-facial-regeneration-tool-P438641?icid2=products%20grid:p438641.

International Search Authority, International Search Report and Written Opinion for PCT/US20/42643, dated Nov. 13, 2020.

* cited by examiner

VIRTUAL HUB FOR THREE-STEP PROCESS FOR MIMICKING PLASTIC SURGERY RESULTS

BACKGROUND

1. Field

This disclosure generally relates to skincare processes. More particularly, the disclosure relates to a computer-implemented hub for delivering a skincare process.

2. General Background

A plastic surgery procedure is typically performed in an office of a plastic surgeon, often at significant expense and inconvenience for those people wanting to improve the appearance of their skin. For instance, many people often have to travel far distances to obtain the services of a qualified plastic surgeon to perform the plastic surgery procedure. Although some people may elect to have a plastic surgery procedure (e.g., facelift, jaw lift, eye wrinkle reduction, etc.) to rejuvenate the appearance of their skin, others require plastic surgery to diminish or eliminate the effects (e.g., scar tissue reduction, burn minimization, etc.) from injuries. As a result, plastic surgery procedures are typically accessible only to a limited group, which may exclude those who need them most.

Furthermore, even when people undergo plastic surgery procedures, risks are associated therewith. In some instances, those undergoing plastic surgery procedures may end up with significant disfiguration. Although the skill and experience of the plastic surgeon may play a part, other factors, such as the way the skin heals for different people, may also lead to potential disfiguration. Ultimately, plastic surgery procedures often involve significant levels of invasiveness that may injure the skin of the user.

Yet, alternative, non-invasive approaches have had questionable, if any, efficacy. For example, one alternative approach utilizes micro current technology to stimulate adenosine triphosphate ("ATP") production in an attempt to create collagen and elastin to provide a lifted appearance of the skin. However, this approach appears to have results that do not mirror plastic surgery results. Another approach may utilize radio frequency ("RF") emissions in conjunction with micro current emissions, but this approach may lead to results that worsen the skin, such as excessive redness. Yet another approach purports to oxygenate the skin to improve blood flow, but has led to health concerns, such as a racing heart, chest pressure, and light headedness.

Accordingly, current skincare configurations suffer from procedures that are too invasive (i.e., plastic surgery procedures that are costly, inconvenient, and vulnerable to possible disfiguration) or too non-invasive (i.e., devices that solely rely on technologies that emit electricity, radio waves, air, or the like above the surface of the skin of a person).

SUMMARY

In one embodiment, a computer program product comprises a non-transitory computer readable storage that has a computer readable program stored thereon. When executed on a computer, the computer readable program causes the computer to generate, with a processor, a graphical user interface ("GUI") that provides audiovisual content associated with a three-step skincare treatment process. In particular, the first step of the three-step skincare treatment process performs, with a derma roller, a plurality of movements along an area of intended rejuvenation of a human user. A second step of the three-step skincare treatment process applies, subsequent to the derma roller performance, a chemical compound to one or more patches of skin at the area of intended rejuvenation. Finally, a third step of the three-step skincare treatment process emits, subsequent to the application of the chemical compound, light toward the area of intended rejuvenation. The three-step process may be customized to a user based on a variety of factors (e.g., area of intended rejuvenation, age, skin sensitivity, or the like).

Additionally, the computer is caused to receive, with the processor, a user input requesting virtual guidance for application of the three-step skincare treatment process via the GUI. Moreover, the computer is caused to generate, with the processor, a demonstration window demonstrating the three-step skincare treatment process.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A computer-implemented hub is provided to electronically deliver a three-step process to a plurality of users via a variety of virtual platforms. The three-step process provides users with skincare rejuvenation that mimics plastic surgery results, without users having to undergo conventional plastic surgery procedures within a plastic surgeon's office. By way of contrast, the three-step process may be performed from the convenience of one's own home, or other place of comfort.

In particular, the three-step process has been discovered to yield results that were not readily predictable; such results mimic the effects of various plastic surgery procedures (e.g., facelifts, jaw lifts, neck lifts, forehead lifts, lower eyelid blepharoplasty, and the like) without a user having to undergo a plastic surgery procedure at the office of a medical practitioner. In essence, the three-step process includes application of various invasive and non-invasive devices/products according to particular parameters to mimic plastic surgery results. Firstly, the three-step process includes usage of a derma roller in an area of intended rejuvenation. Particular needle lengths and movements of the derma roller have been discovered to maximize skin rejuvenation. Secondly, a chemical compound containing vitamin $A_1$ (e.g., Retinol) is applied to the area of intended skin rejuvenation via the channels in the skin created by the derma roller. Accordingly, the chemical compound is able to reach the dermis layer of the skin, directly underneath the epidermis, much faster than would be required through prolonged exposure to the chemical compound; as a result, collagen production is increased in an optimal manner to rejuvenate (i.e., tone, tighten, and/or lift) the skin. Finally, a red light therapy device is utilized to emit red light (i.e., light having a wavelength of six hundred ten nanometers to seven hundred nanometers) toward the area of intended rejuvenation, which further increases collagen production.

Accordingly, the positioning of the chemical compound within the channels created by derma roller, combined with the sequential step of red light emission toward the area of intended rejuvenation, has been discovered to have an enhanced collagen production effect that mimics plastic surgery results.

Furthermore, the same three-step process may be utilized in a universal manner with respect to various portions of the face to mimic plastic surgery results corresponding to different plastic surgery procedures (e.g., face lift, jaw lift, etc.), but with the same process. In other words, one process may be utilized in different zones of the face of a user to mimic plastic surgery results that would typically require different plastic surgery procedures, associated with potentially different visits to a plastic surgeon's office.

Moreover, in one embodiment, the three-step process may be utilized to simultaneously mimic the results from multiple plastic surgery procedures during one application. For example, the user may apply the derma roller to both the skin around the eyes and the skin around the jaw during one application, followed by application of retinol to the skin around the eyes and the skin around the jaw, and followed by red light therapy emission to the skin around the eyes and the skin around the jaw. Accordingly, the three-step process allows a user to simultaneously mimic plastic surgery results corresponding to multiple plastic surgery procedures at the same time, and by using the same process, without necessitating any variation thereto.

Figure 1:
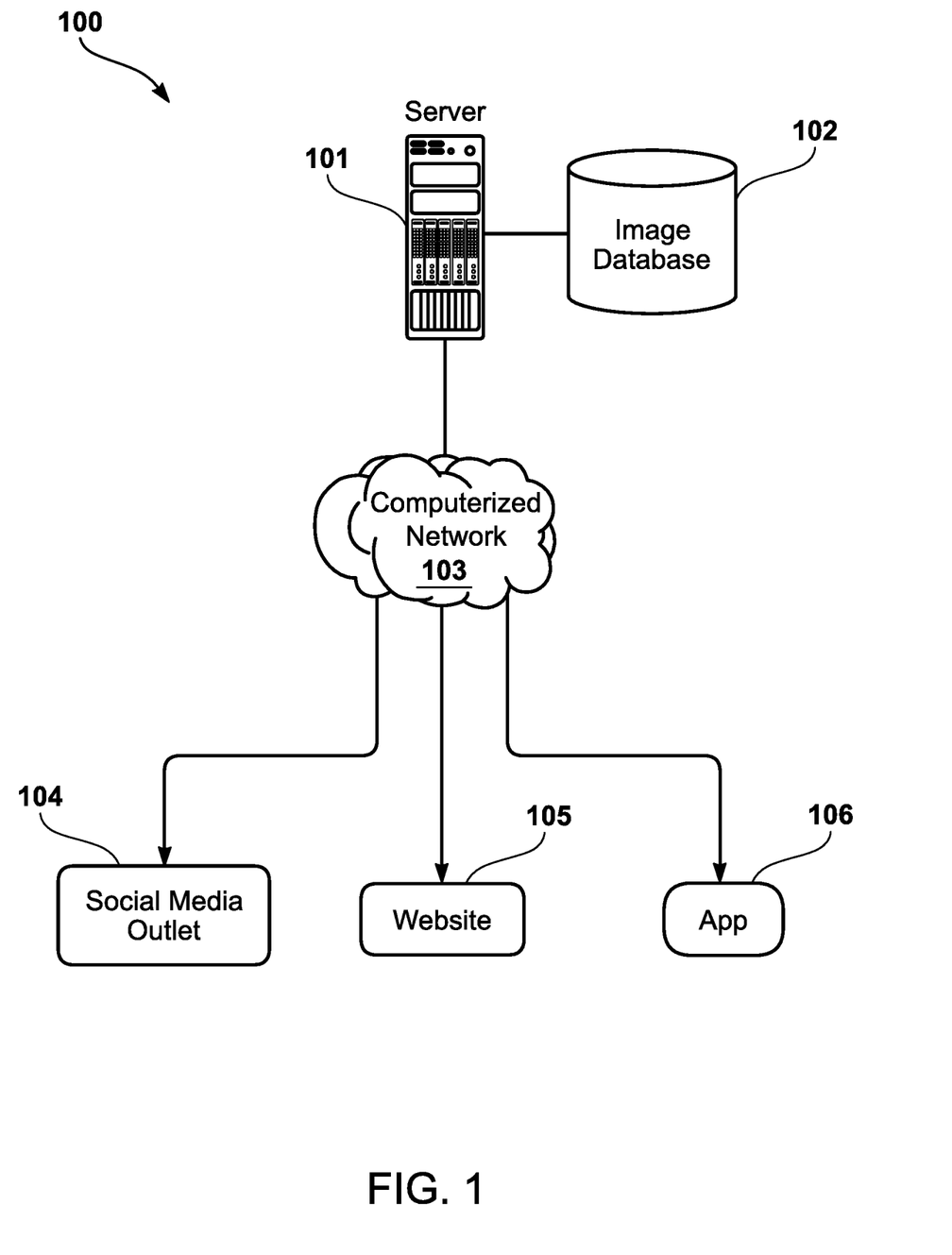
FIG. 1 illustrates a virtual hub system that may be utilized to deliver the three-step process to a variety of virtual platforms, such as social media outlets, websites, and software configurations.

FIG. 1 illustrates a virtual hub system 100 that may be utilized to deliver the three-step process to a variety of virtual platforms, such as social media outlets 106, websites 107, and software configurations 108 (e.g., "apps"). In particular, the virtual hub system 100 has a server 101, which is in operable communication with an image database 102. The server 101 communicates, via a computerized network 103, with the virtual platforms, such as the social media outlets 104, websites 105, and/or apps 106 to deliver audiovisual content associated with the three-step process to users. For example, the virtual hub system 100 may be subscription-based, thereby allowing users to obtain audiovisual content associated with the three-step process on a periodic basis (e.g., new audiovisual content that is available on a daily, weekly, or monthly basis, or after certain milestones have been reached). As another example, the virtual hub system 100 may provide for interactive delivery of the three-step process. With the interactive delivery, users may receive customized guidance (via a virtual practitioner of the three-step process, such as a human user or an avatar operated by an artificial intelligence ("AI") system). Additionally, visual cues may be generated to correspond to the audio emitted from the virtual practitioner. The visual cues may be overlaid over a real-time, or substantially real-time, image captured of the user. As a result, the user of the three-step process is able to conveniently receive virtual interactive guidance on proper usage of the three-step skincare treatment process, all without the need for undergoing in-person visits to a dermatologist's office or a plastic surgeon's office.

Figure 2A:
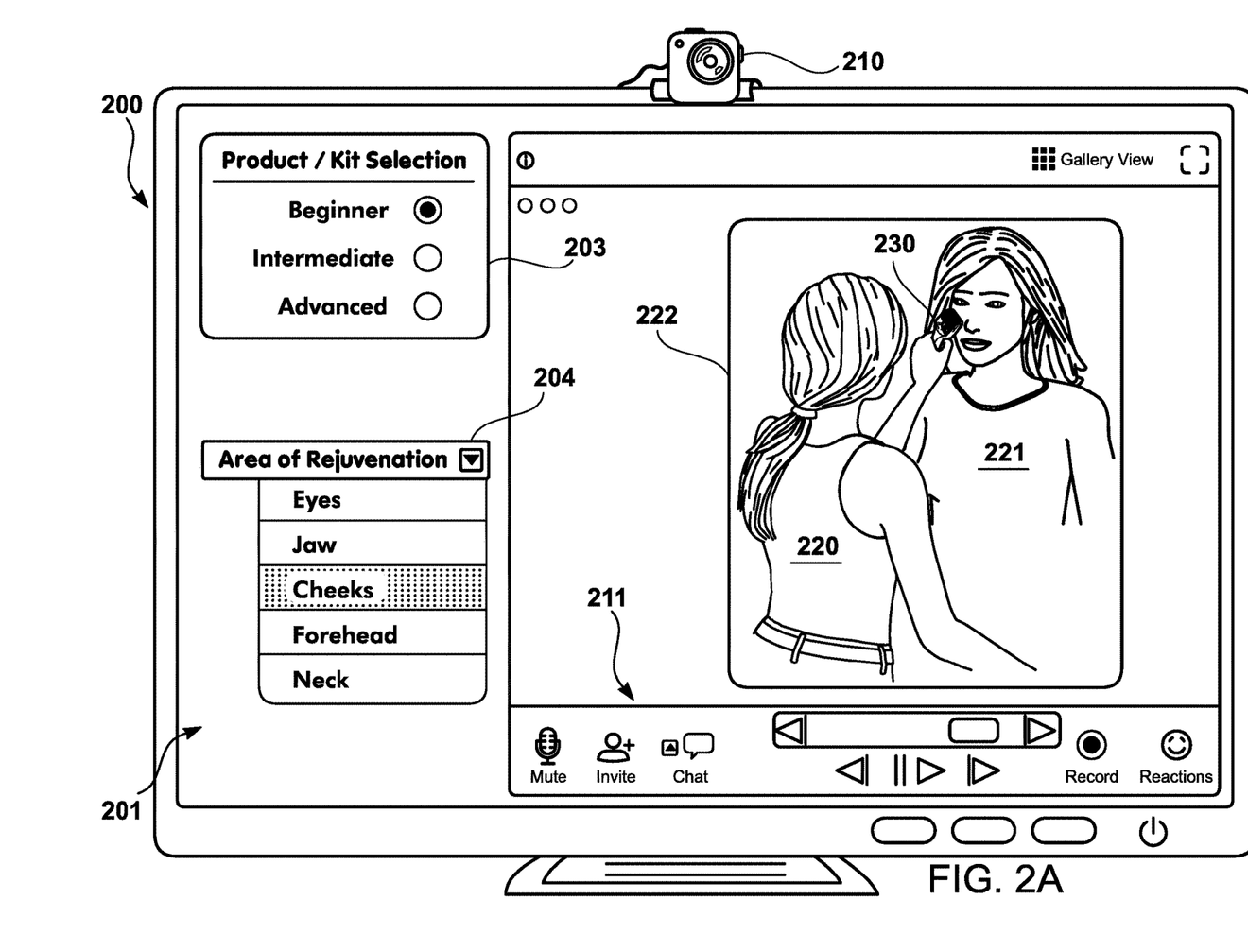
FIG. 2A illustrates the display device rendering the GUI to provide a video instructional for the first step of the three-step process.
Figure 2B:
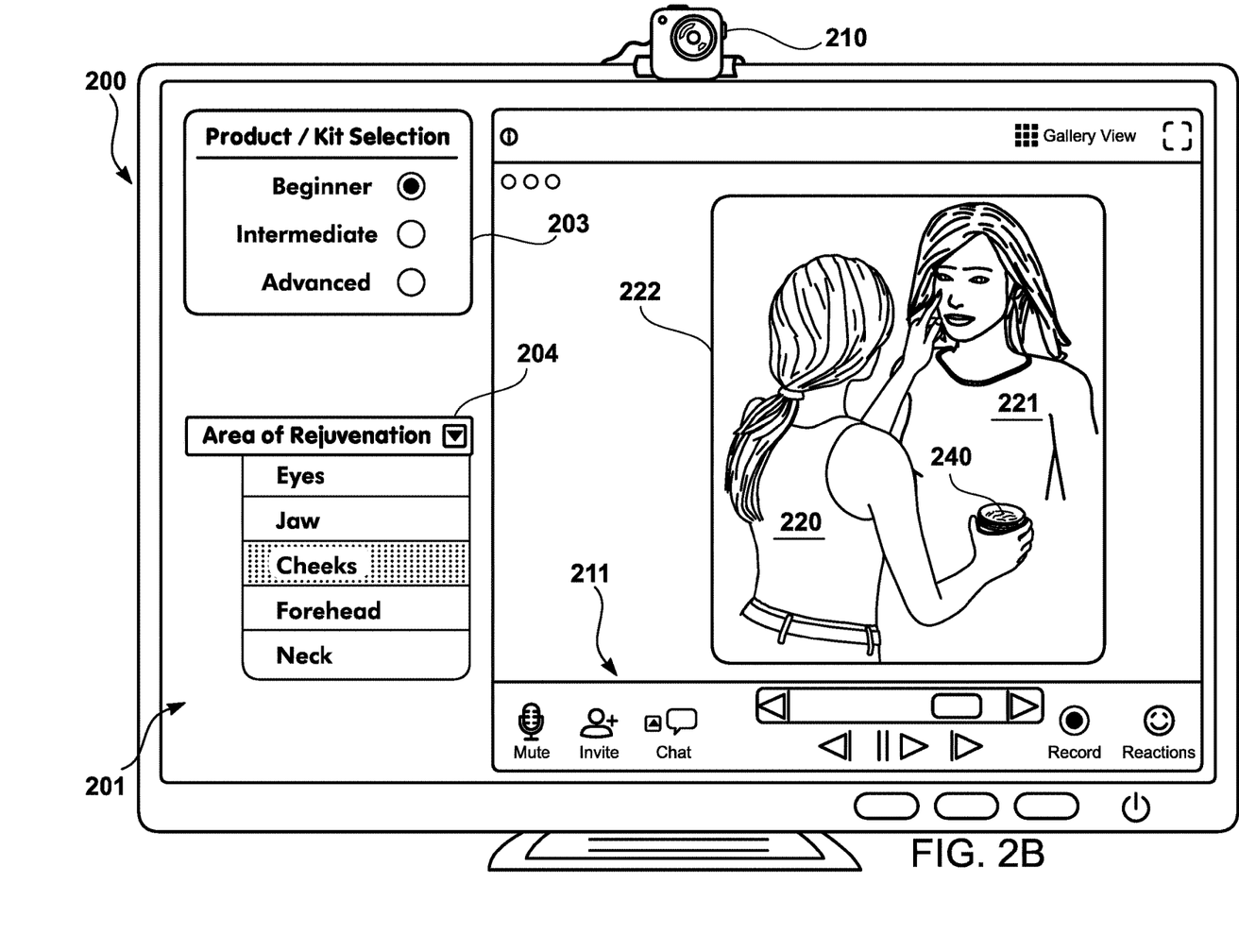
FIG. 2B illustrates the practitioner demonstrating the second step of the three-step process on the demonstration participant.
Figure 2C:
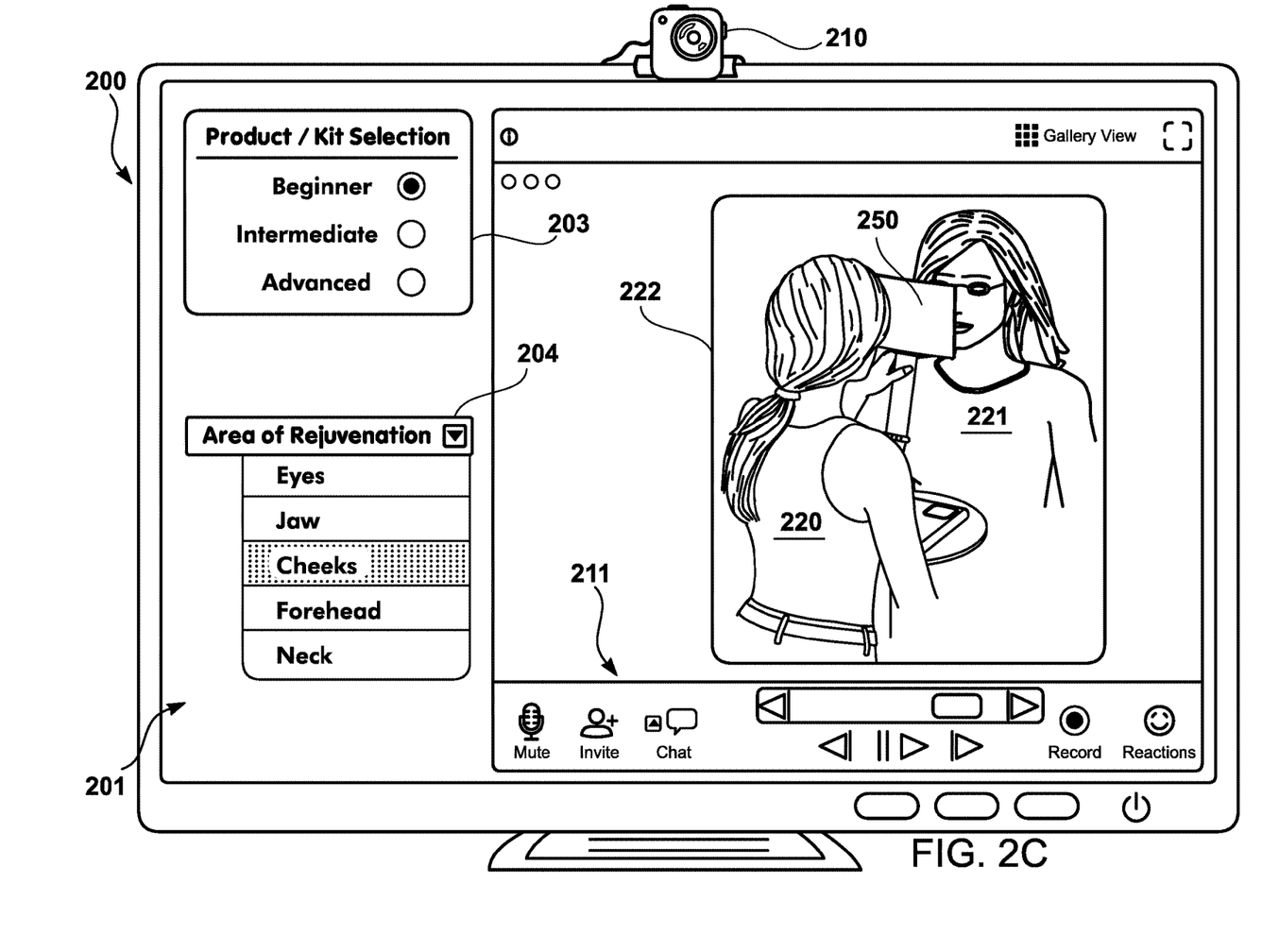
FIG. 2C illustrates the practitioner demonstrating utilization of a red light therapy machine, which is the third step of the three-step process, on the demonstration participant.

FIGS. 2A-2C illustrate a display device 200 that may display a GUI 201 for delivering the three-step skincare treatment process to users via virtual platforms. The display device 200 is illustrated as a computer monitor, as an example; however, the display device 200 may be a variety of other types of display devices, which may or may not be integrated within a computing device (e.g., personal computer, laptop computer, smartphone, tablet device, smartwatch, or the like). Optionally, an image capture device 210 may be in operable communication with, or integrated within, the display device 200. The image capture device 210 may capture imagery of the user for display on the display device 200 operated by the user, and potentially a display device of a human practitioner of the three-step skincare treatment process that may provide guidance to the user regarding the three-step skincare treatment process.

In particular, FIG. 2A illustrates the display device 200 rendering the GUI 201 to provide a video instructional for the first step of the three-step skincare treatment process. As an example, the GUI 201 may be displayed on a subscription-based website 105 that allows users to view audiovisual content based on a subscription fee model. As another example, the GUI 201 may be displayed on an e-commerce website that sells kits/product/accessories corresponding to the three-step skincare treatment process. As yet another example, the GUI 201 may be displayed on a website 105 that is both subscription-based and e-commerce-based. In addition, or in the alternative, to the website 105, the social media outlets 104 and apps 106 may also render the GUI 201.

In one embodiment, the GUI 201 displays a product/kit menu 203, from which the user may provide a user input to select the particular product or kit for which the user wishes to obtain audiovisual content. Alternatively, or in addition, the product/kit menu 203 may have skincare rejuvenation level menu selections (e.g., beginner, intermediate, and advanced) from which the user may select a skincare rejuvenation level that corresponds to the user's current level of the three-step skincare treatment process. In other words, the three-step skincare treatment process is adapted via various parameters (e.g., needle lengths, chemical compound potencies, red light emission exposure times, etc.) to the current skincare rejuvenation level of a user.

Furthermore, the GUI 201 may display an area of skincare rejuvenation menu 204, which allows the user to select the particular part of the skin (e.g., skin around the eyes, jaw, cheeks, forehead, neck, etc.) that is intended to be rejuvenated. The parameters of the three-step process may also be adapted based on the intended area of rejuvenation. For example, certain areas with thicker skin (e.g., stomach) than others (e.g., face) may have corresponding parameters, such as longer needle lengths. Furthermore, the intended area of rejuvenation may be utilized by the server 101, illustrated in FIG. 1, to zoom in on certain portions of the skin, within the image, that are of interest to the user, along with specific visual indicia. For example, the server 101 may utilize the same instructional video for a beginner level user, but may zoom in on check portions, and add in corresponding text, to highlight the area of interest to the user.

Finally, the GUI 201 may have a control menu 211, which allows for various operations to be performed before, during, or after playback of the video instructional, which may be live or prerecorded, displayed in a video instructional window 222. For example, the menu 211 may allow the user to perform playback of a video, invite friends via a social network to join in on watching the video instructional, chat with the video demonstrator(s), record the content, provide reactions, etc.

The particular example of FIG. 2A illustrates a practitioner 220 of the three-step process demonstrating how to utilize the first step of the three-step process on a demonstration participant 221. As an example, the practitioner 220 may be a daughter that is demonstrating the three-step process on a demonstration participant 221, who is her mother. (This example is provided only for illustration purposes. Different types and numbers of practitioners and/or demonstration participants may be utilized.) In particular, the practitioner 220 of the three-step process is illustrated as utilizing a derma roller 230 on the face of the skin of the demonstration participant 221. The practitioner 220 of the three-step process explains how to use the derma roller 230 most effectively on the demonstration participant 221 for the first step of the three-step process, based on a variety of factors. One factor may be the skincare rejuvenation level of the user selected by the user in the product/kit menu 203, which corresponds to the product or kit currently being utilized by the user. Other factors may include, but are not limited to, age, skin type, skin sensitivity, etc. Based on these various factors, the practitioner 220 of the three-step process may suggest certain parameters (e.g., needle length, pressure to be applied by the derma roller 230, etc.).

FIG. 2B illustrates the practitioner 220 demonstrating the second step of the three-step process on the demonstration participant 221. In particular, the practitioner 220 demonstrates application of a chemical compound 240, such as Retinol, on the demonstration participant 221. Based on the various factors discussed with respect to FIG. 2A, the practitioner 220 of the three-step process may suggest different amounts, and methods of applying, the chemical compound 240. For example, the practitioner 220 of the three-step process may suggest that the chemical compound 240 be applied on patches of skin of a predetermined size (e.g., four inches by four inches). Additionally, FIG. 2C illustrates the practitioner 220 demonstrating utilization of a red light therapy machine 250, which is the third step of the three-step process, on the demonstration participant 221. The practitioner of the three-step process may suggest that the red light therapy machine 250 be utilized at various exposure levels, ranging from ten minutes for a beginning user to twenty minutes for an advanced user.

Figure 3A:
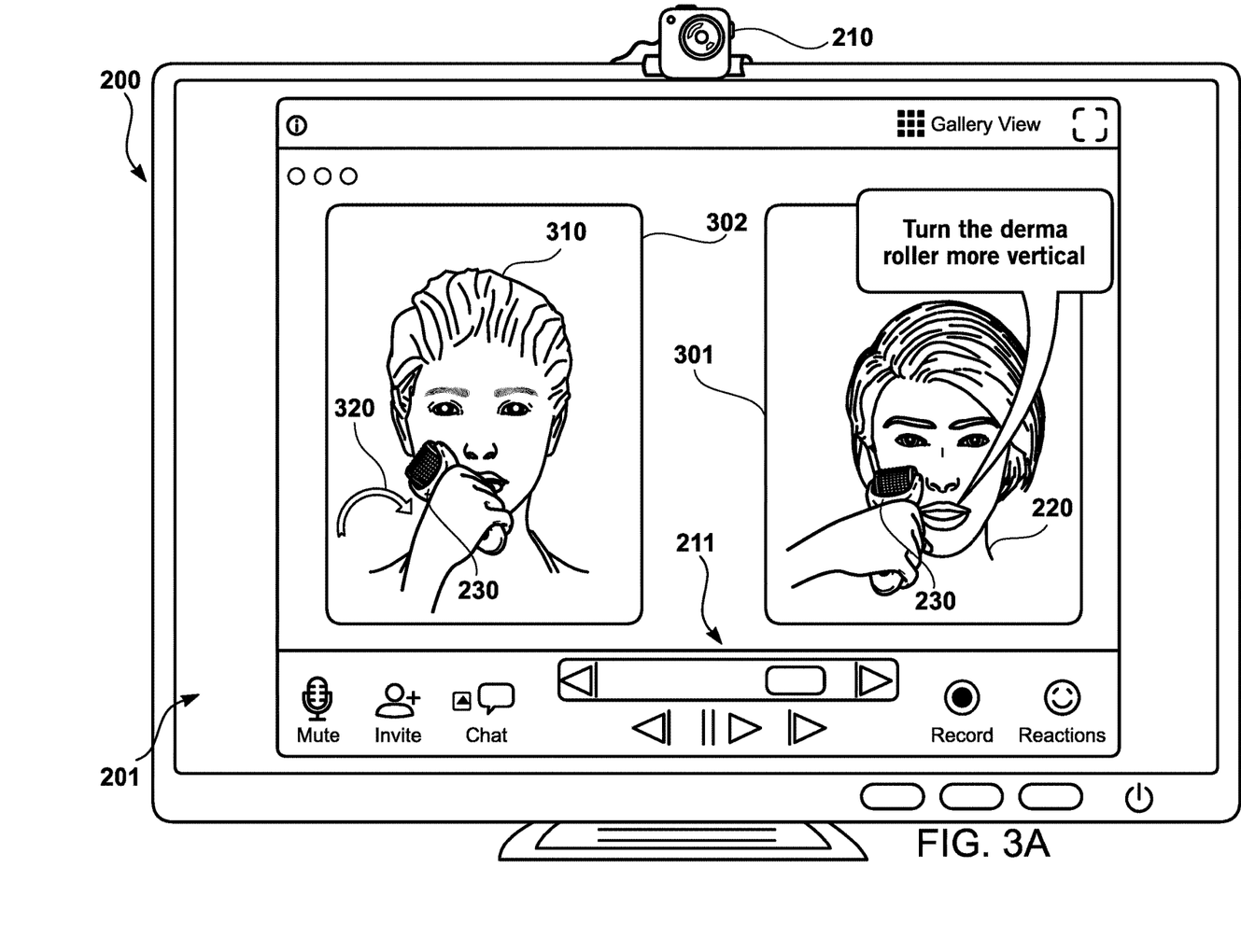
FIG. 3A illustrates the GUI rendering a multi-window configuration such that live imagery of the practitioner is illustrated in a practitioner window and live imagery of the actual user, rather than the demonstration participant, is displayed in a user window during the first step of the three-step process.
Figure 3B:
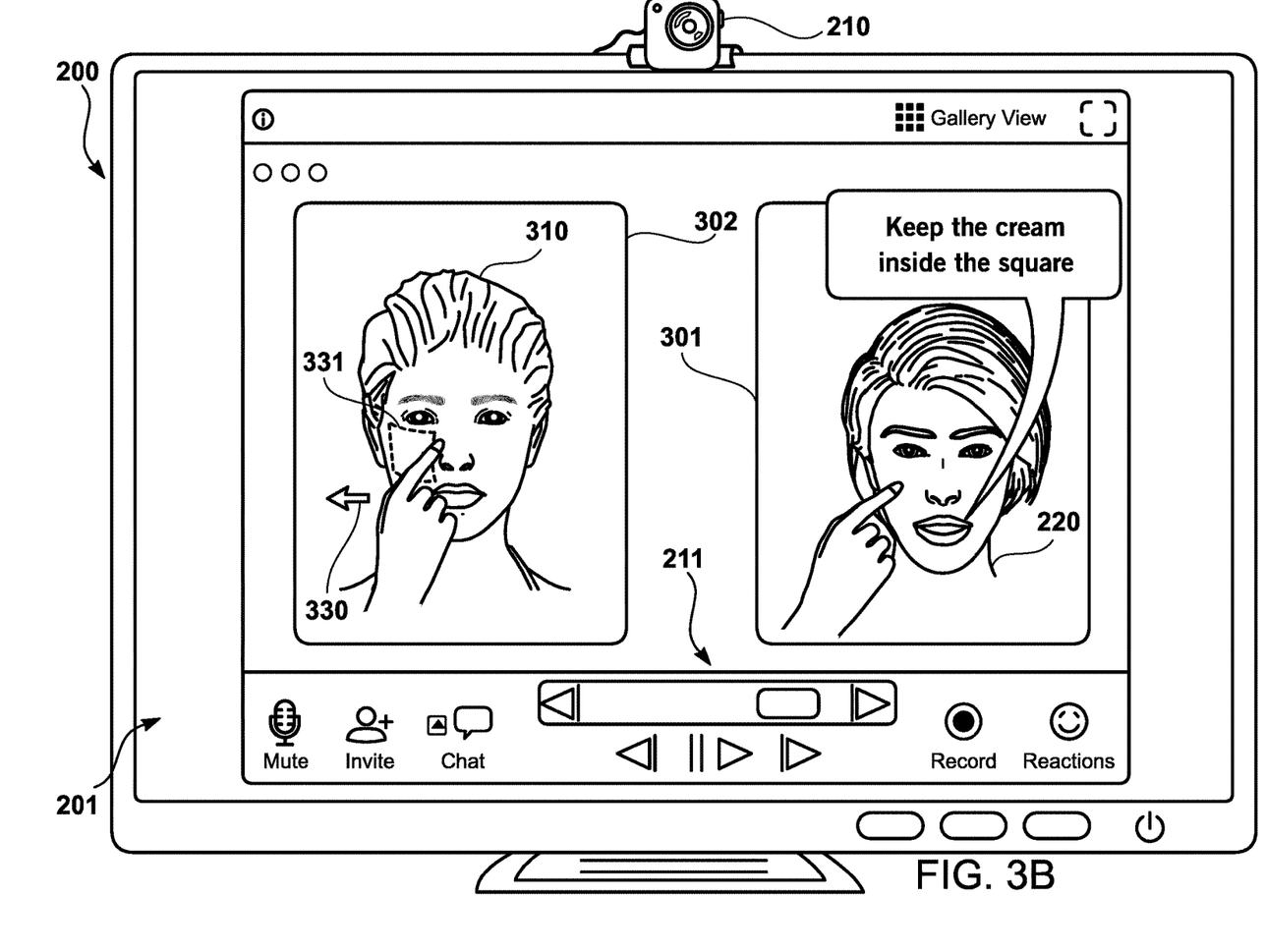
FIG. 3B illustrates the GUI rendering the multi-window configuration such that live imagery of the practitioner is illustrated in the practitioner window and live imagery of the actual user is displayed in a user window during the second step of the three-step process.
Figure 3C:
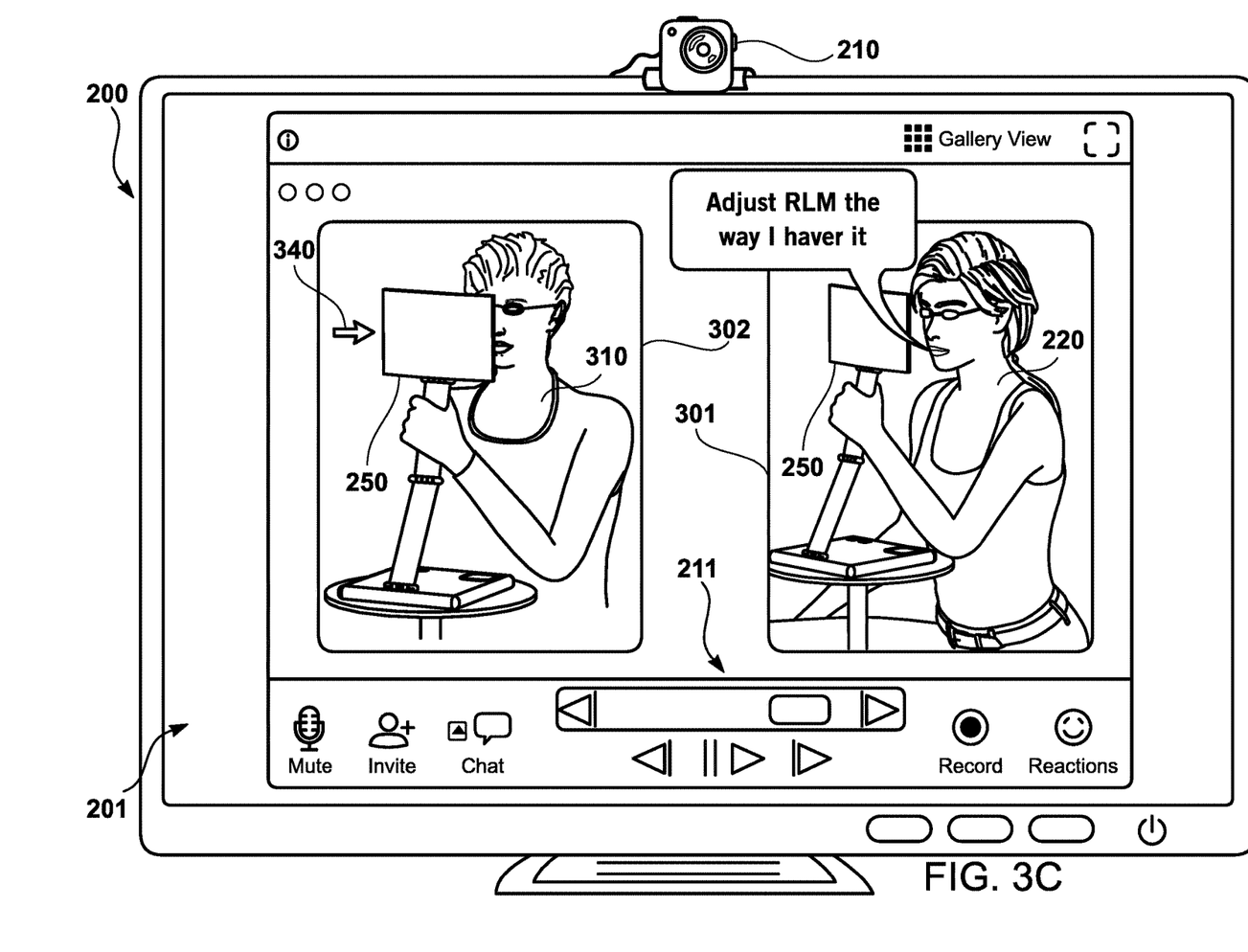
FIG. 3C illustrates the GUI rendering the multi-window configuration such that live imagery of the practitioner is illustrated in the practitioner window and live imagery of the actual user is displayed in the user window during the third step of the three-step process.

FIGS. 3A-3C illustrate the GUI 201 being utilized for interactive guidance of the three-step skincare treatment process. Accordingly, the practitioner 220 may consult directly with the user 310 in a customized virtual session to deliver the three-step skincare treatment process in a one-on-one manner, rather than a one-to-many manner, as illustrated in FIGS. 2A-2C. In particular, FIG. 3A illustrates the GUI 201 rendering a multi-window configuration such that live imagery of the practitioner 220 is illustrated in a practitioner window 301 and live imagery of the actual user 310, rather than the demonstration participant 221, is displayed in a user window 302 during the first step of the three-step process. For example, the image capture device 210 may capture the imagery that is displayed in the user window 302. In one embodiment, the imagery displayed in the practitioner window 301 is captured via an image capture device in operable communication with the computing device operated by the practitioner 220, who may be a human practitioner. In another embodiment, the imagery displayed in the practitioner window 301 is computer generated imagery (e.g., animations, avatars, etc.) that corresponds to an AI system. In other words, the practitioner may be an AI-based computer generated character.

As the practitioner 220 provides visual guidance of how to perform the first step of the three-step skincare treatment process, the practitioner 220 may also vocalize certain instructions on how the user 310 is to perform the first step of the three-step process. For example, the practitioner 220 may vocalize that the user 310 should perform a vertical movement of the derma roller 230. The server 101 may translate the vocal instructions from the practitioner 220 rendered in the practitioner window 301 to visual cues automatically rendered in the user window 302. For example, an arrow 320 may be displayed to indicate the vertical movement. As a result, the user 310 may receive both a vocal instruction from the practitioner window 301 and a visual cue in the user window 302 that instructs the user 310 on proper usage of the first step of the three-step process. For instance, a predetermined maximum quantity of four vertical motions and/or four diagonal motions, at medium pressure (e.g., pressure substantially in the range of ten to fifty pounds per square inch), over the area of intended skin rejuvenation has been discovered to provide optimal skincare rejuvenation results. (The foregoing example range is provided only as an example of a pressure that is not too light to be ineffective, but also not too strong (e.g., one hundred pounds per square inch) to beak the skin without a needle.) In particular, more than four vertical motions has been determined to lead to less optimal results, potentially leading to too much exertion on the skin. The virtual cue may also indicate a number of times that the derma roller has been moved, based on image analysis performed by the server 101 or counting performed vocally by the practitioner 220, which is then translated into text for image rendering in the user window 302.

FIG. 3B illustrates the GUI 201 rendering the multi-window configuration such that live imagery of the practitioner 220 is illustrated in the practitioner window 301 and live imagery of the actual user 310 is displayed in the user window 302 during the second step of the three-step process. In particular, the practitioner 220 demonstrates how to apply the chemical compound 240 within the demonstration window 301, and the user window 302 renders virtual cues corresponding to the vocal instructions. In particular, the user window 302 illustrates a virtual patch 331 that is overlaid over the image of the user 310 captured by the image capture device 210. The server 101 may perform image analysis on the imagery of the user 310 captured by the image capture device 210, and in conjunction with the user input from the area of intended rejuvenation menu 203, overlay the virtual patch over the intended area of rejuvenation (e.g., cheeks). Accordingly, the visual cue 330 (e.g., arrow) rendered in the user window 302 may be based on a combination of verbal instructions received from the practitioner window 220, the user input received from the area of intended rejuvenation window 203, and image analysis performed by the server 101.

Finally, FIG. 3C illustrates the GUI 201 rendering the multi-window configuration such that live imagery of the practitioner 220 is depicted in the practitioner window 301 and live imagery of the actual user 310 is displayed in a user window 302 during the third step of the three-step skincare treatment process. The server 101 may perform image analysis on the imagery of the user 310 captured by the image capture device 210, and in conjunction with background imagery obtained with respect to the red light therapy machine 250 (i.e., the physical distance of the red light therapy machine with respect to the user 310), overlay the virtual patch 331 over the intended area of rejuvenation (e.g., cheeks). For example, the server 101 may be programmed to depict visual indicia 340 to indicate an optimal distance (e.g., four to twelve inches) of the red light therapy machine 250 to a particular area of intended rejuvenation.

Figure 4:
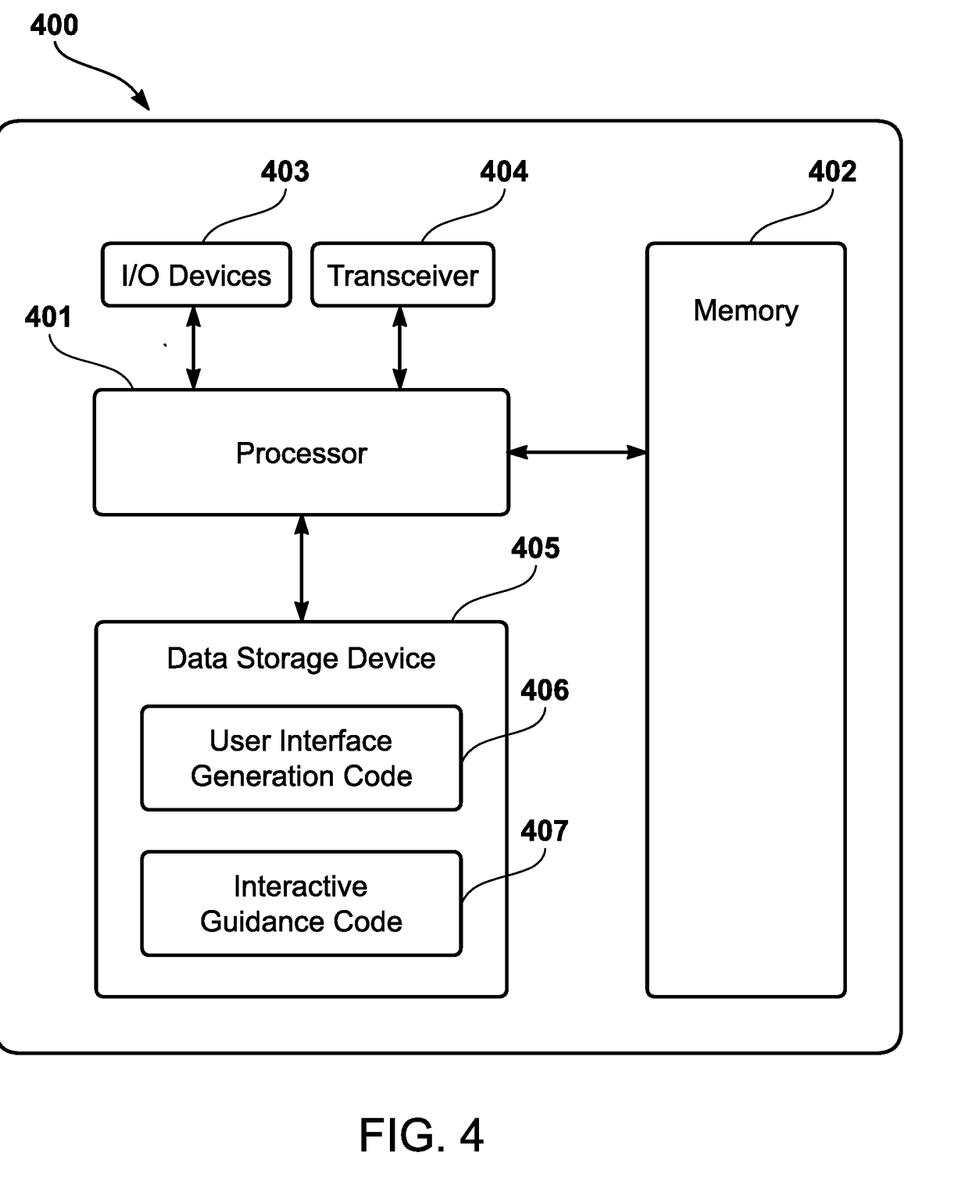
FIG. 4 illustrates a system configuration for the server illustrated in FIG. 1.

FIG. 4 illustrates a system configuration for the server 101 illustrated in FIG. 1. The server 101 may have a processor 401, which may be specialized for interface generation and interface guidance. Accordingly, the processor 401 may be used to perform the operations illustrated in FIG. 1 for rendering of the GUI for the three-step skincare treatment process.

The system configuration may also include a memory device 402, which may temporarily store images from the image database 102, illustrated in FIG. 1, for improved processing times by the processor 401. As a result, the GUI is able to provide real-time (measured as an imperceptible time delay), or substantially real-time (measured as a perceptible time delay that is generally acceptable to the user 310 (e.g., one to two seconds)), audio and/or video instruction for the three-step process via a plurality of virtual platforms. Furthermore, the memory device 402 may store computer readable instructions performed by the processor 401. As an example of such computer readable instructions, a data storage device 405 within the system configuration may store user interface generation code 406 and interactive guidance code 407. The processor 401 may execute the user interface generation code 406 to invoke the GUI 201. Furthermore, the processor 401 may execute the interactive guidance code 407 to generate virtual cues to guide the user 310 during the three-step skincare treatment process.

Moreover, the system configuration may have one or more input/output ("I/O") devices 403 that may receive inputs and provide outputs. Various devices (e.g., image capture devices, keyboard, microphone, mouse, pointing device, hand controller, joystick, display device, holographic projector, etc.) may be used for the I/O devices 403. The system configuration may also have a transceiver 404 to send and receive data. Alternatively, a separate transmitter and receiver may be used instead.

Figure 5:
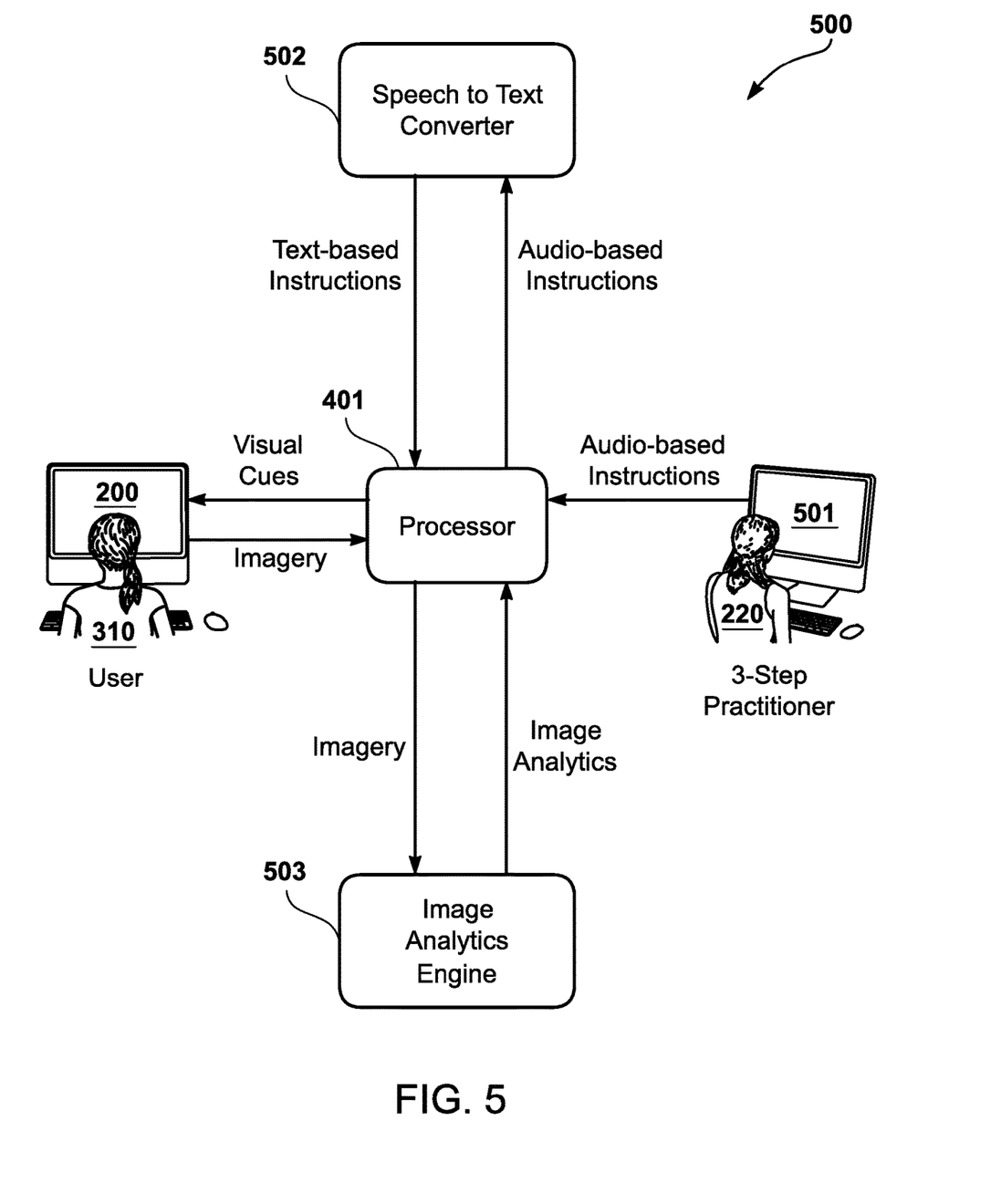
FIG. 5 illustrates a rendering configuration for generating visual cues for the three-step process based on audio instructions received from the practitioner.

FIG. 5 illustrates a rendering configuration 500 for generating visual cues for the three-step skincare treatment process based on audio instructions received from the practitioner 220. In particular, a practitioner computing device 501 sends audio instructions to the processor 401, which may utilize a speech-to-text converter 502 to convert the audio emitted by the practitioner to text. Based, at least in part, on the converted text, the processor 401 is able to determine a virtual cue corresponding to the three-step skincare treatment process to be rendered in the user window 302 at the user computing device 201. Additionally, or in the alternative, imagery may be sent from the user computing device 201 to the processor 401, which may utilized an image analytics engine 503 to perform image analysis on imagery received from the image capture device 201 that is in operable communication with, or integrated within, the user computing device 201.

The GUI described herein helps facilitate usability of the user computing device 201 with respect to the three-step skincare treatment process. In particular, the computing device 201 renders imagery via various virtual platforms (e.g., websites, apps, social media outlets) to provide virtual guidance with respect to the three-step process.

In another embodiment, the GUI 201 may render a video instructional without visual cues that are overlaid over captured imagery of the user 310.

Figure 6:
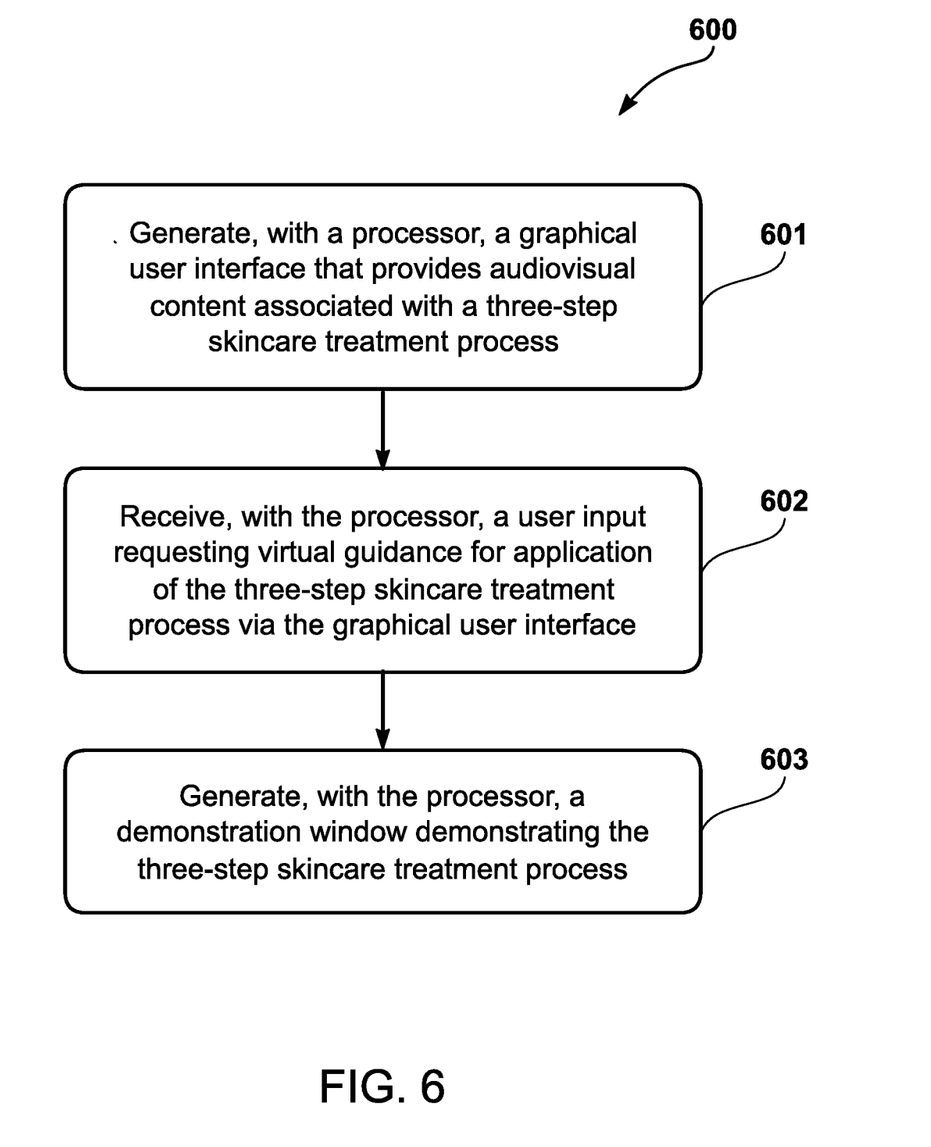
FIG. 6 illustrates a process for generating the GUI for delivery of the three-step process via the virtual hub.

FIG. 6 illustrates a process for generating the GUI 201 for delivery of the three-step skincare treatment process via the virtual hub system 100, illustrated in FIG. 1. At a process block 601, the process 600 generates, with the processor 401, the GUI 201 that provides audiovisual content associated with the three-step skincare treatment process. Firstly, the three-step process performs, with the derma roller 230, a plurality of movements along an area of intended rejuvenation of a human user 310. Secondly, the three-step process applies, subsequent to the derma roller performance, a chemical compound 240 to one or more patches 331 of skin at the area of intended rejuvenation. Thirdly, the three-step process emits, subsequent to the application of the chemical compound 240, light toward the area of intended rejuvenation. At a process block 602, the process 600 receives, with the processor 401, a user input requesting virtual guidance for application of the three-step skincare treatment process via the GUI 201. Finally, at a process block 603, the process 600 generates, with the processor 401, a demonstration window demonstrating the three-step skincare treatment process.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

I claim:

1. A computer program product comprising a non-transitory computer readable storage device having a computer readable program stored thereon, wherein the computer readable program when executed on a computer causes the computer to:

generate, with a processor, a graphical user interface that provides audiovisual content associated with a three-step skincare treatment process, the three-step skincare treatment process comprising:
performing, with a derma roller, a predetermined maximum number of movements in each of one or more predetermined directions along an area of intended rejuvenation of a face of a human user, wherein the predetermined maximum number of movements equals four, the derma roller having a head with a plurality of needles each having a length of five tenths millimeters situated thereon, applying, subsequent to the dermal roller performance, a chemical compound to one or more patches of skin at the area of intended rejuvenation, the one or more patches of skin each having a predetermined patch size, the chemical compound comprising vitamin $A_1$, the predetermined patch size equaling four inches in length by four inches in width, and emitting, subsequent to the application of the chemical compound, red light toward the area of intended rejuvenation for a minimum predetermined period of time of ten minutes, the red light having a wavelength in the range of six hundred ten nanometers to seven hundred nanometers;

receive, with the processor, a user input requesting virtual guidance for application of the three-step skincare treatment process via the graphical user interface; and generate, with the processor, a demonstration window demonstrating the three-step skincare treatment process.

2. The computer program product of claim 1, wherein the demonstration window depicts a human demonstrator demonstrating the three-step skincare treatment process on a human subject.

3. The computer program product of claim 2, wherein the computer is further caused to receive, with the processor, a user input indicating an area of intended rejuvenation.

4. The computer program product of claim 3, wherein the computer is further caused to select, with the processor, prerecorded content displayed in the demonstration window based on one or more parameters associated with the area of intended rejuvenation.

5. The computer program product of claim 2, wherein the computer is further caused to receive, with the processor, a user input indicating a skincare rejuvenation level.

6. The computer program product of claim 3, wherein the computer is further caused to select, with the processor, prerecorded content displayed in the demonstration window based on one or more parameters associated with the area of intended rejuvenation.

7. The computer program product of claim 2, wherein the computer is further caused to generate, with the processor, a user window within the graphical user interface that displays an image of a user performing the three-step skincare treatment process in conjunction with the human demonstrator.

8. The computer program product of claim 7, wherein the computer is further caused to generate, with the processor, a virtual cue to correct a step in the three-step process based on an audio-based emission from the demonstration window.

9. The computer program product of claim 7, wherein the computer is further caused to generate, with the processor, a virtual cue to correct a step in the three-step process based on an audio-based emission from the demonstration window and based on imagery captured by a user computing device operated by the user during the demonstration.

10. The computer program product of claim 1, wherein the computer is further caused to generate, with the processor, a friend request for a friend in a social media network to remotely view the demonstration in conjunction with the user.

11. A computer program product comprising a non-transitory computer readable storage device having a computer readable program stored thereon, wherein the computer readable program when executed on a computer causes the computer to:

generate, with a processor, a graphical user interface that provides audiovisual content associated with a three-step skincare treatment process, the three-step skincare treatment process comprising:

performing, with a derma roller, a predetermined maximum number of movements in each of one or more predetermined directions along an area of intended rejuvenation of a face of a human user, wherein the predetermined maximum number of movements equals four, applying, subsequent to the derma roller performance, a chemical compound to one or more patches of skin at the area of intended rejuvenation, and emitting, subsequent to the application of the chemical compound, light toward the area of intended rejuvenation; and receive, with the processor, a user input requesting virtual guidance for application of the three-step skincare treatment process via the graphical user interface;

generate, with the processor, a demonstration window demonstrating the three-step skincare treatment process.

12. The computer program product of claim 11, wherein the demonstration window depicts a human demonstrator demonstrating the three-step skincare treatment process on a human subject.

13. The computer program product of claim 12, wherein the computer is further caused to receive, with the processor, a user input indicating an area of intended rejuvenation.

14. The computer program product of claim 13, wherein the computer is further caused to select, with the processor, prerecorded content displayed in the demonstration window based on one or more parameters associated with the area of intended rejuvenation.

15. The computer program product of claim 12, wherein the computer is further caused to receive, with the processor, a user input indicating a skincare rejuvenation level.

16. The computer program product of claim 13, wherein the computer is further caused to select, with the processor, prerecorded content displayed in the demonstration window based on one or more parameters associated with the area of intended rejuvenation.

17. The computer program product of claim 12, wherein the computer is further caused to generate, with the processor, a user window within the graphical user interface that displays an image of a user performing the three-step skincare treatment process in conjunction with the human demonstrator.

18. The computer program product of claim 17, wherein the computer is further caused to generate, with the processor, a virtual cue to correct a step in the three-step process based on an audio-based emission from the demonstration window.

19. The computer program product of claim 17, wherein the computer is further caused to generate, with the processor, a virtual cue to correct a step in the three-step process based on an audio-based emission from the demonstration window.

20. The computer program product of claim 11, wherein the computer is further caused to generate, with the processor, a friend request for a friend in a social media network to remotely view the demonstration in conjunction with the user.

\* \* \* \* \*